United States Patent Office 3,492,336
Patented Jan. 27, 1970

3,492,336
ANTIOXIDANT SYNERGIST FOR POLYOLEFINS
Silvio L. Giolito, Whitestone, N.Y., assignor to Stauffer Chemical Company, New York, N.Y., a corporation of Delaware
No Drawing. Filed Dec. 16, 1966, Ser. No. 602,152
Int. Cl. C07c *149/20;* C08f *45/58*
U.S. Cl. 260—481    4 Claims

ABSTRACT OF THE DISCLOSURE

Compounds of the formula:

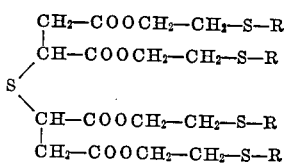

wherein R is alkyl containing from one to about eighteen carbon atoms inclusive. These compounds have utility as synergistic stabilizers with phenolic type stabilizers in the stabilization of polyolefins.

---

The present invention relates to novel compounds, which exhibit a stabilizing effect on olefin polymers, and to synergistic stabilizer compositions containing such compounds.

The olefin polymers such as polyethylene, polypropylene ethylene-propylene copolymers and the like have in recent years come into widespread use. It is well known, however, that these polymers are subject to thermal, oxidative and ultraviolet degradation. Because of this deficiency it has been found necessary to add small but effective amounts of various compounds which have been found to stabilize such polymers.

In accordance with the present invention, novel compounds have been found which provide to olefin polymer compositions a stability to both oxidizing and thermal deterioration. These novel compounds are the tetra alkyl-thiodisuccinates. It has additionally been found that the novel compounds of this invention exhibit a synergistic stabilizing effect in olefin polymers when used in combination with 4,4'-butylidene bis(3-methyl-6-t-butyl phenol). Because of this synergistic effect lower amounts of stabilizer are required.

The novel tetra-alkyl thioethyl thiodisuccinates of this invention are represented by the formula:

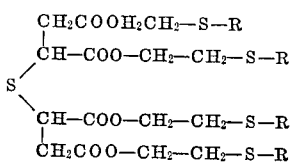

wherein R is an alkyl group containing from 1 to 18 carbon atoms, such as methyl, ethyl, propyl, butyl, pentyl, hexyl, octyl, nonyl, decyl, undecyl, dodecyl, tridecyl, heptadecyl, octadecyl and the like, and R in each instance can be the same or different. When used as stabilizers for olefin polymers it is preferred that the R groups represented above be normal, i.e., straight chain although branched chain alkyl can be used.

The tetra-alkyl thioethyl thiodisucciates are readily prepared by the reaction of maleic anhydride with an alkyl thioethyl alcohol to provide the corresponding succinate acid ester. This ester is thereafter heated with hydrogen sulfide in the presence of a tertiary amine catalyst to provide the tetraalkyl thioethyl thiodisuccinate in accordance with the following reaction diagram:

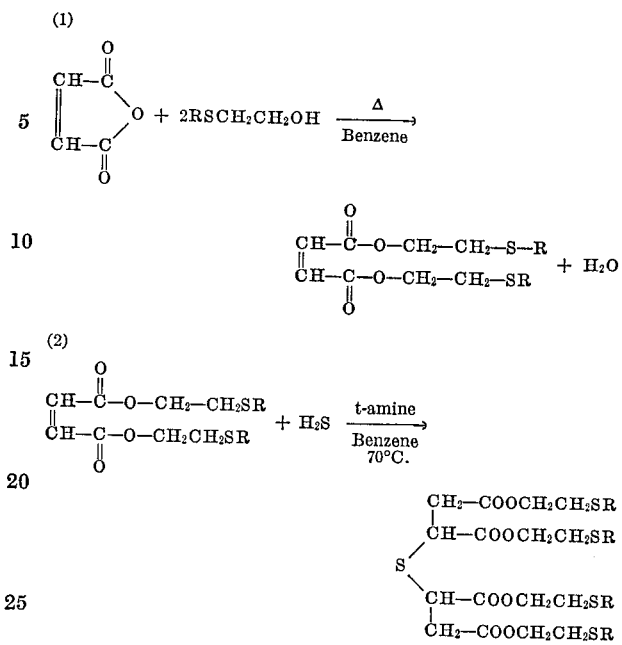

In the reaction diagram above, R is as has been heretofore defined.

In this preparation stoichiometric amounts can be used, although slight excess of the alkyl thioethanol and large excess of hydrogen sulfide can be used to advantage.

In both the first and second stages of the reaction as indicated above in the reaction diagram, the temperatures used to effect reaction can conveniently be the reflux temperature of the solvent employed desirably within the range of from about 30° C. to about 100° C. although higher and lower temperatures can successfully be employed if desired.

Both reaction stages are desirably conducted in the presence of an inert solvent, preferably having a boiling point in the range of from about 30° to 100° C. Illustrative of suitable solvents such as benzene, toluene and the like; and the aliphatic hydrocarbons solvents such as petroleum ether and the like.

As indicated above, the second stage of the reaction is desirably conducted in the presence of a catalyst. While many catalysts may be effective for this reaction, tertiary alkyl amines have been found to be most suitable. Such tertiary amines include those having the formula: R$_3$N, wherein R has been heretofore defined. Preferred, however, are the lower alkyl amines such as trimethyl amine, triethyl amine and the like.

The synergistic component which can be used in combination with the novel compounds of this invention is 4,4'-butylidene bis(3-methyl-6-t-butyl phenol) having the formula:

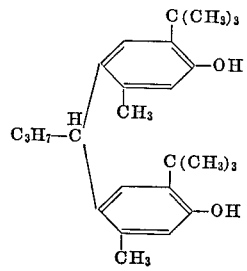

This compound is commercially available under the name Santowhite P (trademark).

By the term olefin polymers is meant those polymers formed through the homopolymerization or copolymerization of an olefin monomer containing from 2 to 6 carbon atoms although more usually from 2 to 3 carbon atoms inclusive. Illustrative of such olefin polymers are polyethylene, polypropylene, ethylene, propylene copolymer, and the like.

The synergistic stabilizing composition of this invention comprises from about .01 to about 5.0 parts by weight of 4,4'-butylidene bis(3-methyl-6-t-butyl phenol) and about .05 to about 5 parts by weight of tetra-alkyl thioethyl thiodisuccinate. These ingredients are thoroughly admixed to form a homogeneous blend. It has been found preferred to use these components in a ratio of from about 0.1:1 to 1:0.1 based on weight.

In the stabilization of olefin polymer a stabilizing amount is used. This generally constitutes from about 0.1 to about 5.0 parts by weight per hundred parts polymer of the antioxidant synergistic compositions. This composition is added to the olefin polymer and thoroughly blended therewith. The antioxidant can be blended with the olefin polymer by any of the commercial techniques presently utilized. However, it has been found desirable to blend the polymer and the antioxidant in the molten state. However, since the olefin polymer is normally prepared in the form of a powder which is then extruded and pelletized for further processing in an extruder, it is possible to provide the stabilization to the polymer by coating the powder therewith. This can be easily accomplished by dissolving the antioxidant in a suitable solvent such as benzene, toluene, or isopropanol, then evaporating the solvent.

When the tetra-alkyl thiodisuccinates of this invention are used alone as olefin polymer stabilizers, they are used in a stabilizer amount. This generally constitutes from about 0.1 to about 7.5 parts by weight per hundred polymer.

The following example serves to illustrate this invention.

EXAMPLE 1

Tetradodecylthioethyl thiodisuccinate preparation 52 grams of n-dodecylthioethanol and 10.1 grams of maleic anhydride was dissolved in benzene and brought to reflux with the azeotropic removal of water. Hydrogen sulfide gas was bubbled into the reactor for several hours with triethyl amine as a catalyst. The reaction was conducted at temperatures between 50 and 70° C. Purification of the product gave 25 grams of a waxy solid at a 50% yield. Analysis indicated that sulfur was present in an amount of 13.7% as opposed to 13.76 calculated. Infrared analysis confirmed the structure of tetradodecylthioethyl thiodisuccinate, designated A 1551 in the table below.

STABILIZATION EFFECT

Samples of commercial grade unstabilized polypropylene such as Profax® 6501 (Hercules) were utilized to evaluate the stabilization effect of 4,4'-butylidene bis(3-methyl-6-t-butyl phenol), ("Santowhite P"), alone, and the tetradodecylthioethyl thiodisuccinate, alone, and in combination. Each of the antioxidants was melt blended with the polypropylene which was milled into a sheet. This sheet was subjected to temperatures of 150° during which it was subject to degradation of both heat and air. Table I below sets forth the results of these experiments:

TABLE I

["Santowhite Powder" 0.1% plus A-1551 (0.2%), 200 hours]

| Control | Wt. percent in polypropylene | Hours |
|---|---|---|
| 'Santowhite Powder' | 0.1 | (1) |
| Do | 0.3 | 23–30 |
| Do | 0.5 | 38–40 |
| A-1551 | 0.3 | 23 |
| A-1551 | 0.5 | 139 |

[1] No results.

From the results set forth in Table I, above, it can be readily seen that a marked synergistic effect is provided by the combination of the tetra-alkyl thioethyl thiodisuccinate with 4,4'-butylidene bis(3-methyl-6-t-butyl phenol).

In a manner similar to that shown above, other tetra-alkyl thioethyl thiodisuccinates can be easily prepared and used in combination with the other synergist to provide stabilization of polymer olefins. For example, tetramethylthioethyl thiodisuccinates can be prepared through the utilization of methyl thioethanol. The hexyl analog can be prepared through the utilization of hexyl thioethanol. The octadecyl analog can be prepared through the substitution of the octadecyl thioethanol for the dodecyl thioethanol indicated above. Similarly, the evaluation of these synergistic compositions in polyethylene can be conducted by substituting the unstabilized polyethylene for the polypropylene shown above.

The tetra-alkyl thioethyl thiodisuccinates of this invention similarly serve to provide excellent stability to olefin polymer compositions when used in combination with other phenolic compounds than 4,4'-butylidene bis(3-methyl-6-t-butyl phenol). Other phenolic compound stabilizers include the alkyl substituted phenolic compounds wherein the alkyl substituents contain at least a total of three carbon atoms, such as 2,6-di-tert-butyl para cresol; the 2,4-dialkyl phenols such as 2,4-diethyl phenol, 2,4-dibutyl phenol and the like; and the 2,4,6-trialkyl phenols such as 2,4,6-triethyl phenol, 2,4,6-trihexyl phenol and the like. Other phenolic compounds so utilizable include the aromatic substituted phenols such as phenyl phenol and alkyl substituted polynuclear phenols such as the derivatives of bis phenol A. Other useful phenolic synergists include such commercial products as Topanol CA, a condensation product of bis phenol A and croton aldehyde made by I.C.I., Irgonox 1093, a substituted hindered phenol manufactured by Geigy Chemical Company and Ionox 330, a phenyl substituted di-tert-butyl phenol, manufactured by Shell Chemical Company.

What is claimed is:

1. A compound of the formula:

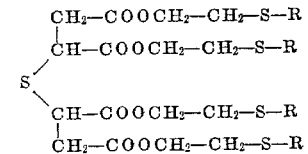

wherein R is an alkyl group containing from one to eighteen carbon atoms inclusive.

2. The compound of claim 1 wherein R is a dodecyl group.
3. The compound of claim 1 wherein R is methyl.
4. The compound of claim 1 wherein R is octadecyl.

References Cited

UNITED STATES PATENTS 3,398,116    8/1968    Gidito _____ 260—45.85

JAMES A. PATTEN, Primary Examiner

EDWARD GLEIMAN, Assistant Examiner

U.S. Cl. X.R.

260—45.85, 485